Feb. 13, 1962   R. D. GOULD ET AL   3,020,695
TREE SHAKING DEVICE
Filed May 9, 1960
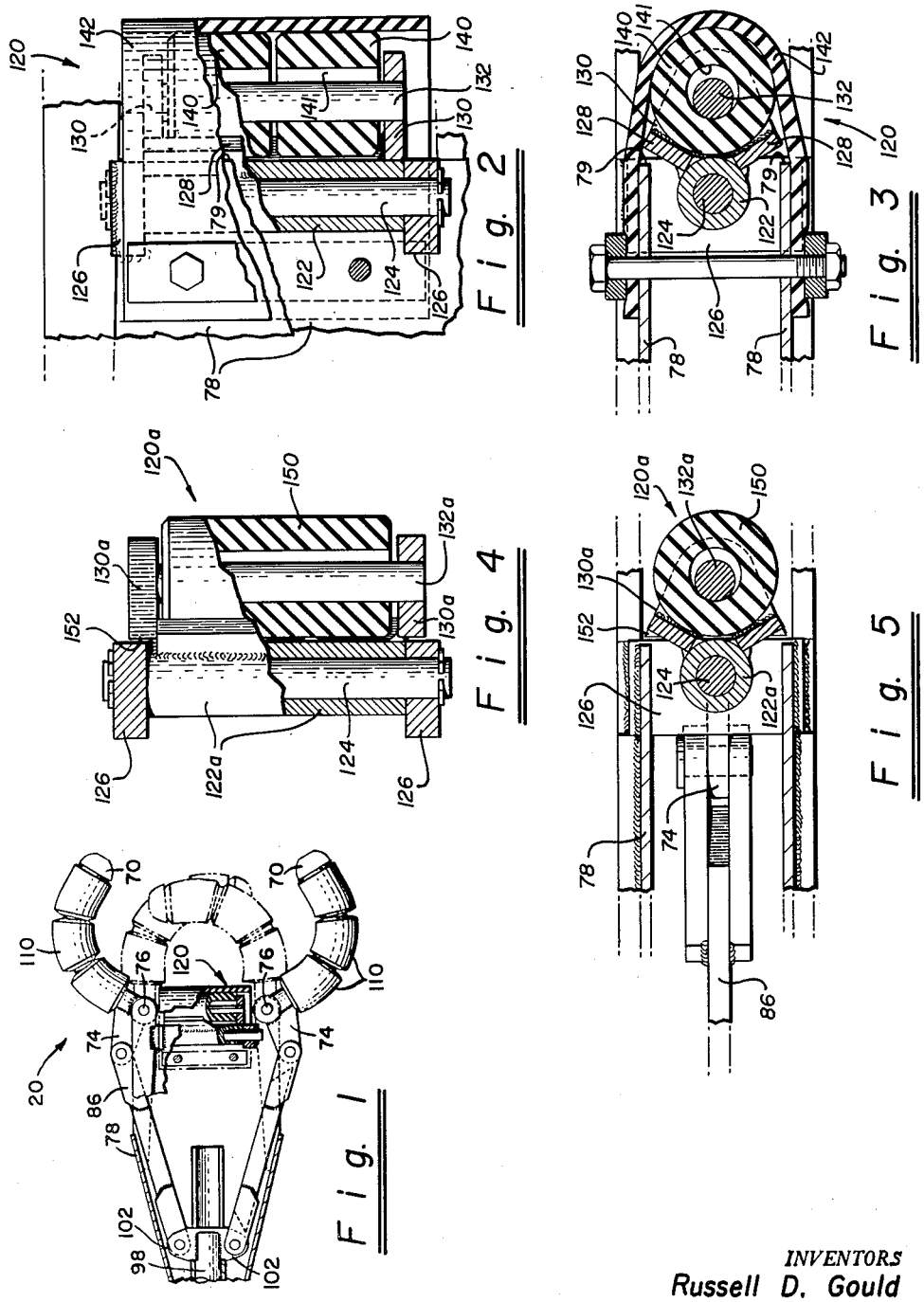
INVENTORS
Russell D. Gould
BY John E. Richter
Attorneys

United States Patent Office 3,020,695
Patented Feb. 13, 1962

3,020,695
TREE SHAKING DEVICE
Russell D. Gould, 12570 N. Capitol Ave., San Jose 27, Calif., and John E. Richter, 502 Morse, San Jose, Calif.
Filed May 9, 1960, Ser. No. 27,949
10 Claims. (Cl. 56—328)

This invention relates generally to tree shaking machines and to improved apparatus for use in such machines.

In one such machine there is provided means to positively grasp a limb, branch or other portion of a tree to effect a careful, efficient shaking action. The machine therein disclosed employs an elevatable boom provided with a reciprocating central member extending lengthwise to the outer end of the boom. The free end of the reciprocating member is equipped with a hooking mechanism by which a desired tree member can be positively grasped for shaking without undue stresses being placed upon such member.

In general, it is an object of the present invention to improve upon apparatus of this type, particularly with respect to means provided to absorb the impact and friction of initial contact.

It is another object of the invention to provide apparatus of the above type which functions to permit internal movement and collapse under load whereby the shaking mechanism is caused to absorb the forces of friction and abrasion rather than the bark of the engaged tree member.

A further object of the invention is to provide such apparatus which automatically deforms to the shape of the engaged tree member upon contact, and during the shaking operation.

Additional objects and advantages will appear from the following description and from the drawings, in which:

FIGURE 1 is a view in section and elevation of an improved hooking and shaking mechanism embodying the invention;

FIGURE 2 is an enlarged view, similar to FIGURE 1, showing details of a back pad portion of the mechanism;

FIGURE 3 is a view along the line 3—3 of FIGURE 2; and

FIGURES 4 and 5 are views like FIGURES 2 and 3 of a modified mechanism in accordance with the invention.

Generally stated, the present invention relates to improvements in hooking mechanisms of the type described above, and makes use of a deflatable back pad or cushion means between the opposed hook members. More specifically, the cushion means comprises a back plate carrying one or more annular members providing a deflatable air pocket on the forward or tree engaging side of the pad. In a preferred embodiment, the cushion means is pivotally mounted on the reciprocating portion of the boom, between the hook members, and supports an outer flexible covering adapted to a certain amount of sliding movement with respect to the cushion means. The hooking members function to positively grasp a tree member against such cushion means, which pivots into proper position with respect to the tree member, with deformation and some relative sliding to absorb the friction and impact of engagement.

As illustrated in connection with the present invention, the hooking mechanism 20 includes a pair of opposed hook members 70 pivoted at 76 on the housing 78. The members 70 are adapted to be operated by cranks 74 connected to a push rod or actuator 98 by means of the links 86, 102. The hooking mechanism also includes the back pad 120 mounted between the hook members, and against which a branch can be positively gripped by the hook members. The housing 78 supporting the hooking mechanism is carried by the reciprocating central member of the boom (not shown), and through the hooking mechanism transmits the shaking action to an engaged branch.

Referring to FIGURES 2 and 3, the back pad or cushion means 120 can be seen to include a back plate assembly 122 mounted for pivotal movements on a cross shaft 124. The latter is carried by struts or cross supports 126 extending between the spaced apart sides of the housing 78. As best seen in FIGURE 3, the back plate 122 includes portions 128 extending outwardly at an obtuse angle to provide a shallow trough or support for the annular deformable means 140. It also includes end plates 130 which provide a means to mount a support 132 for the annular means, in spaced parallel relation to the back plate.

In the embodiment illustrated in FIGURES 2 and 3, the annular means 140 comprises a pair of resilient deformable cylinders of a relatively soft, spongy material such as rubber or an elastomer. Preferably the wall thickness of each cylinder is approximately equal to the spacing between the back plate 122 and the support 132 so as to positively position the cylinders to provide an air pocket 141 forward of the support 132, as shown. It will be understood that the cylinders 140 are readily deformable a distance equal to the interior spacing from the support 132, plus an additional amount related to the compressibility of the rubber or elastomer from which the cylinders are fabricated.

Referring to FIGURE 3, the mounting of the back plate 122 permits limited pivotal movements of the annular members 140 about the pivot shaft 124. More specifically, the extent of pivotal movement is determined by the spacing between the upper edges 79 of the housing 78 and the portions 128 of the back plate. In general, about 10 to 20 degrees pivotal movement on either side of the boom center line will be sufficient for the purposes of the invention, although a greater or lesser degree of pivotal movement may be found desirable for particular shaking operations.

The embodiment of FIGURES 1 to 3 also incorporates an outer flexible covering or sheath 142 adapted to slidably embrace the annular members 140. This outer covering, which preferably comprises thick rubber belting or similar material, can be secured directly to the outer side walls of the housing 78, for example as in FIGURE 3. The covering 142 extends completely about the outer end of the housing and the cushioning members 140, and is bendable with the cushioning members during shaking contact. A certain amount of sliding also occurs between covering and the cushioning members, with the result that bark movement such as might strip portions of the bark from the tree is prevented.

In some instances, it may be desirable to omit the outer flexible covering 142, and employ the annular members directly as the cushioning means between the opposed hook members. The modified embodiment shown in FIGURES 4 and 5 is illustrative of such an apparatus, and makes use of an elongated integral cushioning member 150. The member 150 is mounted on the back plate 122a in similar fashion to the mounting of the members 140, with the exception that the end supports 130a of the back plate are provided with extending portions 152 adapted to abut the struts 126. This construction serves to reduce the amount of pivotal movement permitted to the back plate, as will be readily apparent from FIGURE 5. In other respects, the construction of the modified device can be substantially as described in connection with FIGURES 1 to 3.

In the use of the hooking mechanisms just described, the boom is maneuvered into position to bring the back pad 120 (or 120a) into engagement with a desired tree member, for example as in FIGURE 1 of our copending application. During this maneuvering, the hook members 70 remain in the open position. Upon contact of the cushioning means with the limb, the annular members 140 (or 150) deform against the spaced support of the back plate, and substantially absorb the impact of engagement. At the same time, a certain amount of pivoting occurs about the pivot shaft 124, with the result that the annular members generally accommodate themselves to the contour of the limb. When the outer flexible covering 142 is used, as in FIGURES 1 to 3, the covering 142 tends to slide somewhat about the annular members so that forces which normally would produce frictional drag along the limb are largely absorbed within the cushioning means. A similar effect can be achieved with the modified device of FIGURES 4 and 5 by spacing of the shaft 124a and support 132a to permit a degree of rolling of the annular member 150 against the branch.

Following the initial engagement of the cushioning means, the push rod 98 is advanced to swing the resilient pads 110 of the hook members into positive holding engagement with the back side of the branch. The branch is thus completely enveloped by the thick rubber pads of the hook members, and the deformable cushion means 120. Such grasping contact insures a maximum distribution of shaking forces over the engaged portion of the tree, with a minimum transference of impact or abrading contacts with the limb surface.

From the foregoing, it should be apparent that the present invention provides a number of advantages when used in conjunction with a hook type shaking mechanism. Specifically it provides a hooking mechanism having a cushioned vibrating pad which readily aligns itself with the engaged tree surface, and which simultaneously provides a deformable air pocket within the pad to permit a maximum absorption of the initial shock of engagement. With the air pocket compressed, the material of the pad thereafter presents a thick resilient cushioning layer which conforms to the engaged tree surface as it absorbs the vibration of the shaking action. With the additional provision of an outer flexible covering, internal movement or sliding within the pad tends to reduce frictional abrasion of the limb and consequently the tendency toward bark damage.

We claim:
1. In a tree shaking mechanism of a type employing a boom mounting a pair of opposed hook members adapted to positively grasp and hold a tree member, deformable cushion means positioned between said members, said cushion means comprising a back plate, a support spaced from the back plate, and annular means mounted for rotation on said support so as to be deformable in a direction generally toward said back plate.

2. A device as in claim 1 wherein said annular means comprises a cylinder of resilient deformable material encircling said support, said cylinder having a wall thickness equal to the spacing between said back plate and support, and a central aperture of a larger diameter than the diameter of said support.

3. A device as in claim 1 wherein said cushion means is substantially in the plane of said pair of opposed hook members and supported to be moved away from the plane of said hook members.

4. A tree hooking means adapted for use in a tree shaking mechanism comprising an elevatable shaker boom, opposed hook means carried at the free end of said boom, cushion means pivotally mounted between said hook means, said cushion means comprising a back plate pivotally mounted on the boom, means mounting an elongated support in spaced relation from said back plate for pivotal movement therewith, and deformable annular means encircling said support, said annular means being held between said support and back plate so as to be deformable toward said back plate, whereby said hook means is adapted to positively grasp a tree member against said deformable cushion means.

5. A mechanism as in claim 4 wherein said boom mounts a flexible covering adapted to extend in sliding relation about said cushion means, said flexible member sliding against the cushion means upon contact with a tree member to thereby reduce the tendency toward bark damage.

6. A mechanism as in claim 4 wherein said boom is provided with stops adapted to limit the pivotal motion of said back plate.

7. A tree shaking mechanism, comprising: an elongated elevatable boom; hook means mounted on the free end of said boom for pivotal movements toward one another; cushion means pivotally mounted between said hook means, said cushion means including a back plate mounted for pivotal movements on said boom, side extensions on said back plate, a cylindrical support extending between said extensions so as to be spaced in parallel relation to said back plate, and at least one annular deformable member encircling said support so as to be deflatable in a direction generally toward said back plate; and flexible covering means attached to said boom and extending about said cushion means.

8. A mechanism as in claim 7 wherein said back plate includes outwardly extending portions generally defining an obtuse angle therebetween for receipt of said annular member.

9. In a tree shaking mechanism of a type employing a boom mounting a pair of opposed hook members adapted to positively grasp and hold a tree member, deformable cushion means positioned between said members, said cushion means comprising a rear support and means including a deformable air pocket mounted on a forward side of said rear support and adapted to cushioning the shock of initial engagement with said tree member.

10. In a tree shaking mechanism of a type employing a boom mounting a pair of opposed hook members to positively grasp and hold a tree member, deformable cushion means positioned between said members, said cushion means comprising a back plate mounted for pivotal movement relative to said boom, a support spaced from the back plate, and annular means mounted on said support so as to be deformable in a direction generally towards said back plate.

References Cited in the file of this patent

UNITED STATES PATENTS

| | | |
|---|---|---|
| 592,499 | Stephens | Oct. 26, 1897 |
| 1,626,068 | Bartlett | Apr. 26, 1927 |
| 2,449,487 | Kroll | Sept. 14, 1948 |
| 2,562,071 | Stueland | July 24, 1951 |
| 2,714,281 | Steele | Aug. 2, 1955 |
| 2,822,205 | Bowie | Feb. 4, 1958 |
| 2,891,372 | Goodwin | June 23, 1959 |